United States Patent

Mayenfels et al.

[11] Patent Number: 5,780,541
[45] Date of Patent: Jul. 14, 1998

[54] NONAQUEOUS PAINTS

[75] Inventors: Peter Mayenfels; Georg Wigger, both of Münster; Fritz Bartol, Hamm; Ulrike Röckrath, Senden; Ulrich Poth, Münster, all of Germany

[73] Assignee: BASF Lacke + Farben, AG, Muenster-Hiltrup, Germany

[21] Appl. No.: 578,650

[22] PCT Filed: Jul. 7, 1994

[86] PCT No.: PCT/EP94/02236

§ 371 Date: Feb. 20, 1996

§ 102(e) Date: Feb. 20, 1996

[87] PCT Pub. No.: WO95/03367

PCT Pub. Date: Feb. 2, 1995

[30] Foreign Application Priority Data

Jul. 24, 1993 [DE] Germany .................. 43 24 947.7

[51] Int. Cl.[6] .................. C08J 3/00; C08K 3/20; C08L 75/00; C08F 8/30
[52] U.S. Cl. .................. 524/590; 525/123; 525/124; 525/455; 528/45
[58] Field of Search .................. 524/590; 525/123, 525/124, 455; 528/45

[56] References Cited

U.S. PATENT DOCUMENTS 4,677,180  6/1987  Schmitt et al. .................. 528/45

FOREIGN PATENT DOCUMENTS 26 39 491 B1  2/1976  Germany .................. C09D 3/72

Primary Examiner—Patrick D. Niland

[57] ABSTRACT

The invention relates to nonaqueous paints which comprise (A) a hydroxyl group-containing synthetic resin or a mixture of hydroxyl group-containing synthetic resins (B) an amino resin or a mixture of amino resins (C) a blocked polyisocyanate or a mixture of blocked polyisocyanates, and (D) a pigment or a mixture of pigments, and are characterized in that component (C) contains both isocyanate groups blocked with a blocking agent (I) and isocyanate groups blocked with a blocking agent (II), in which context
the blocking agent (I) is a dialkyl malonate or a mixture of dialkyl malonates,
the blocking agent (II) is a blocking agent which is different from (I) and contains active methylene groups, or is an oxime, or is a mixture of these blocking agents, and
the ratio of equivalents between the isocyanate groups blocked with (I) and the isocyanate groups blocked with (II) is between 1.0:1.0 and 9.0:1.0.

9 Claims, No Drawings

NONAQUEOUS PAINTS

The invention relates to nonaqueous paints comprising
(A) a hydroxyl group-containing synthetic resin or a mixture of hydroxyl group-containing synthetic resins
(B) an amino resin or a mixture of amino resins
(C) a blocked polyisocyanate or a mixture of blocked polyisocyanates, and
(D) a pigment or a mixture of pigments.

JP-A-2-242867 describes nonaqueous paints containing (A) a hydroxyl group-containing synthetic resin, (B) an amino resin, (C) a blocked polyisocyanate and (D) pigments, in which context components (B) and (C) are to be selected such that the temperature at which a chemical reaction between (A) and (C) ensues should be not more than 20° C. below and not more than 50° C. above the temperature at which a chemical reaction between (A) and (B) ensues.

The nonaqueous paints described in JP-A-2-242867 give coatings which, in particular with regard to their resistance to organic solvents and acids, their scratch resistance and their tendency to yellowing, are in need of improvement.

DE-B-26 39 491 describes nonaqueous coatings materials which contain a hydroxyl group-containing polyester resin and/or alkyd resin, hexamethylene diisocyanate blocked with an alkyl acetoacetate, and/or 2,2,4 trimethylhexamethylene diisocyanate blocked with an alkyl acetoacetate, and an amino resin. The coatings obtained using these coating materials undergo yellowing, especially when elevated baking temperatures and/or prolonged baking times are employed, and are to be improved in particular with regard to their resistance to acids and organic solvents and with regard to their scratch resistance.

The present invention relates to nonaqueous paints of the type mentioned at the beginning, which are characterized in that component (C) contains both isocyanate groups blocked with a blocking agent (I) and isocyanate groups blocked with a blocking agent (II), in which context the blocking agent (I) is a dialkyl malonate or a mixture of dialkyl malonates, the blocking agent (II) is a blocking agent which is different from (I) and contains active methylene groups, or is an oxime, or is a mixture of these blocking agents, and the ratio of equivalents between the isocyanate groups blocked with (I) and the isocyanate groups blocked with (II) is between 1.0:1.0 and 9.0:1.0.

The coatings which can be produced using the paints according to the invention are distinguished by a high degree of hardness, high gloss, good adhesion, good topcoat holdout, good scratch resistance and good resistance to climatic effects, to organic solvents and to acids, and a high resistance to yellowing (especially to yellowing occurring as a result of high baking temperatures and/or as a result of long baking times). The nonaqueous paints according to the invention are also distinguished by high storage stability and can also be processed well with a low content (e.g. less than 50% by weight) of organic solvents.

Component (A) may in principle be any hydroxyl group-containing synthetic resin which is suitable for transparent topcoats, or a mixture of such synthetic resins. As component (A) it is preferred to employ hydroxyl group-containing polyester resins and/or hydroxyl group-containing alkyd resins and/or hydroxyl group-containing polyacrylate resins, and mixtures of these resins. The synthetic resins employed as component (A) generally have hydroxyl numbers of from 40 to 240, preferably from 60 to 150, and number-average molecular weights of from 1500 to 30,000, preferably from 2000 to 15,000, particularly preferably from 2500 to 7500.

Hydroxyl group-containing polyester resins, alkyd resins and polyacrylate resins are well known. Examples of such resins and their preparation are described in, for example, JP-A-2-24 28 67, DE-B-26 39 491 and in the patent documents specified on page 6 in lines 31 to 36.

As component (A) it is particularly preferred to employ polyacrylate resins which can be prepared by polymerizing
(a) from 10 to 92, preferably from 20 to 60, % by weight of an alkyl or cycloalkyl acrylate or of an alkyl or cycloalkyl methacrylate having 1 to 18, preferably 4 to 13, carbon atoms in the alkyl or cycloalkyl radical, or mixtures of such monomers,
(b) from 8 to 60, preferably from 12.5 to 38.5, % by weight of a hydroxyalkyl acrylate or of a hydroxyalkyl methacrylate having 2 to 4 carbon atoms in the hydroxyalkyl radical, or mixtures of such monomers,
(c) from 0.0 to 5.0, preferably from 0.7 to 3.0, % by weight of acrylic acid or methacrylic acid, or mixtures of these monomers, and
(d) from 0 to 50, preferably from 0 to 30, % by weight of ethylenically unsaturated monomers which are different from (a), (b) and (c) and are copolymerizable with (a), (b) and (c), or mixtures of such monomers to give polyacrylate resins having hydroxyl numbers of from 40 to 240, preferably from 60 to 150, acid numbers of from 0 to 35, preferably from 5 to 20, glass transition temperatures of from −35° to +70° C., preferably from −20° to +40° C., and number-average molecular weights of from 1500 to 30,000, preferably from 2000 to 15,000 (determined by gel permeation chromatography using a polystyrene standard).

Examples of components (a) are: methyl, ethyl, propyl, n-butyl, isobutyl, tert-butyl, pentyl, hexyl, heptyl and 2-ethylhexyl acrylate and methacrylate, and also cyclohexyl acrylate and cyclo-hexyl methacrylate.

Examples of components (b) are:
hydroxyethyl, hydroxypropyl and hydroxybutyl acrylate and methacrylate.

Examples of components (d) are: aromatic vinyl compounds, for example styrene, vinyl-toluene, α-methylstyrene, α-ethylstyrene, ring-substituted diethylstyrenes, isopropylstyrene, butylstyrenes and methoxystyrenes; vinyl ethers, for example ethyl vinyl ether, n-propyl vinyl ether, isopropyl vinyl ether, n-butyl vinyl ether and isobutyl vinyl ether, and vinyl esters, for example vinyl acetate, vinyl propionate, vinyl butyrate, vinyl pivalate and the vinyl ester of 2-methyl-2-ethylheptanoic acid.

The hydroxyl number and the acid number of the polyacrylate resins can be controlled by the person skilled in the art without problems, by the quantity of component (b) and/or (c) employed.

The glass transition temperature of the polyacrylate resins is determined by the nature and quantity of the monomers employed. The monomers can be selected by the person skilled in the art with the aid of the following formula, with which the glass transition temperatures of polyacrylate resins can be approximately calculated:

$$\frac{1}{T_G} = \sum_{n=1}^{n=x} \frac{W_n}{T_{Gn}}$$

$T_G$ = glass transition temperature of the polyacrylate resin
$x$ = number of different monomers incorporated by polymerization in the polyacrylate resin.
$W_n$ = proportion by weight of the nth monomer
$T_{Gn}$ = glass transition temperature of the homopolymer of the nth monomer Measures for controlling the molecular weight (e.g. selection of appropriate polymerization initiators, use of chain transfer agents, etc.) are part of the expert knowledge of the person of average skill in the art, and require no further explanation here.

As component (A) it is also particularly preferred to employ polyester resins or alkyd resins, which can be prepared by reacting (α) a cycloaliphatic or aliphatic polycarboxylic acid or a mixture of such polycarboxylic acids (β) an aliphatic or cycloaliphatic polyol having more than two hydroxyl groups per molecule, or a mixture of such polyols (γ) an aliphatic or cycloaliphatic diol or a mixture of such diols and (δ) an aliphatic linear or branched saturated monocarboxylic acid or a mixture of such mono-carboxylic acids in a molar ratio of (α): (β): (γ): (δ)= 1.0:0.2–1.3:00–1.1:00–1.4, preferably 1.0:0.5–1.2:0.0–0.6:0.2–0.9, to give a polyester resin or alkyd resin.

Examples of components (α) are: hexahydrophthalic acid, 1,4-cyclohexanedicarboxylic acid, endomethylenetetrahydrophthalic acid, oxalic acid, malonic acid, succinic acid, glutaric acid, adipic acid, pimelic acid, suberic acid, azelaic acid and sebacic acid.

Examples of components (β) are: pentaerythritol, trimethylolpropane, trimethylolethane and glycerol.

Examples of components (γ) are: ethylene glycol, diethylene glycol, propylene glycol, neopentylglycol, 2-methyl-2-propylpropane-1,3-diol, 2-ethyl-2-butylpropane-1,3-diol, 2,2,4-trimethylpentane-1,5-diol, 2,2,5-trimethylhexane-1,6-diol, neopentylglycol hydroxypivalate and dimethylolcyclo-hexane.

Examples of components (δ) are: 2-ethylhexanoic acid, lauric acid, isooctanoic acid, isononanoic acid and mixtures of monocarboxylic acids obtained from coconut oil or palm kernel oil.

The preparation of polyester resins and/or alkyd resins carrying hydroxyl groups is described in, for example, Ullmanns Encyklopädie der technischen Chemie [Ullmann's Encyclopedia of Industrial Chemistry], third edition, 14th volume, Urban & Schwarzenberg, Munich, Berlin 1863 [sic], pages 80 to 89 and pages 99 to 105, and in the books: Résines Alkydes-Polyesters [Alkyd-Polyester Resins] by J. Bourry, Paris Verlag Dunod 1952, Alkyd Resins by C. R. Martens, Reinhold Publishing Corporation, N.Y. 1961 and Alkyd Resin Technology by T. C. Patton, Interscience Publishers 1962.

As component (B) it is possible in principle to employ any amino resin which is suitable for transparent topcoats, or a mixture of such amino resins.

Such resins are well known to the person skilled in the art and are supplied by many companies as commercial products. Amino resins are condensation products of aldehydes, especially formaldehyde, and, for example, urea, melamine, guanamine and benzoguanamine. The amino resins contain alcohol groups, preferably methylol groups, which in general are partially or, preferably, completely etherified with alcohols.

As component (B) it is preferred to employ melamine-formaldehyde resins which are etherified with lower alcohols, especially with methanol or butanol. It is particularly preferred to employ as component (B) melamine-formaldehyde resins which are etherified with lower alcohols, especially with methanol and/or butanol, and which as a statistical mean still contain from 0.1 to 0.25 hydrogen atoms attached to nitrogen atoms per triazine ring.

The nonaqueous paints according to the invention contain as component (C) a blocked polyisocyanate or a mixture of blocked polyisocyanates, component (C) containing both isocyanate groups blocked with a blocking agent (I) and isocyanate groups blocked with a blocking agent (II), in which context the blocking agent (I) is a dialkyl malonate or a mixture of dialkyl malonates, the blocking agent (II) is a blocking agent which is different from (I) and contains active methylene groups, or is an oxime, or is a mixture of these blocking agents, and the ratio of equivalents between the isocyanate groups blocked with (I) and the isocyanate groups blocked with (II) is between 1.0:1.0 and 9.0:1.0, preferably between 8.0:2.0 and 6.0:4.0, particularly preferably between 7.5:2.5 and 6.5:3.5.

Component (C) is preferably prepared as follows. A polyisocyanate or a mixture of polyisocyanates is reacted in a manner known per se with a mixture of the blocking agents (I) and (II), the mixture of the blocking agents (I) and (II) containing the blocking agents (I) and (II) in a molar ratio which is between 1.0:1.0 and 9.0:1.0, preferably between 8.0:2.0 and 6.0:4.0, and particularly preferably between 7.5:2.5 and 6.5:3.5. The polyisocyanate or the mixture of polyisocyanates can be reacted with the mixture of the blocking agents (I) and (II) to such an extent that no further isocyanate groups can be detected. In practice this may necessitate the use of very large excesses of blocking agents and/or very long reaction times. It has now been found, surprisingly, that paints with the good properties described above are also obtained if at least 50, preferably at least 70, percent of the isocyanate groups of the polyisocyanate or of the mixture of polyisocyanates are reacted with the mixture of the blocking agents (I) and (II) and the remaining isocyanate groups are reacted with a hydroxyl group-containing compound or with a mixture of hydroxyl group-containing compounds. The hydroxyl group-containing compounds employed are preferably low molecular weight aliphatic or cycloaliphatic polyols, such as neopentylglycol, dimethylolcyclohexane, ethylene glycol, diethylene glycol, propylene glycol, 2-methyl-2-propylpropane-1,3-diol, 2-ethyl-2-butyl-propane-1,3-diol, 2,2,4-trimethylpentane-1,5-diol and 2,2,5-trimethylhexane-1,6-diol, or the hydroxyl group-containing synthetic resins which can be employed as component (A).

Component (C) is also obtainable by mixing, with the blocking agents (I) and (II), blocked polyisocyanates in a ratio such that the resulting mixture has a ratio of equivalents between the isocyanate groups blocked with (I) and the isocyanate groups blocked with (II) which is between 1.0:1.0 and 9.0:1.0, preferably between 8.0:2.0 and 6.0:4.0, and particularly preferably between 7.5:2.5 and 6.5:3.5. This procedure for the preparation of component (C) is less preferred.

In principle, all polyisocyanates which can be employed in the paint sector can be employed for the preparation of component (C). However, It is preferred to employ polyisocyanates whose isocyanate groups are attached to aliphatic or cycloaliphatic radicals. Examples of such polyisocyanates are hexamethylene diisocyanate, isophorone diisocyanate, trimethylhexamethylene diisocyanate, dicyclohexylmethane diisocyanate and 1,3-bis(2-isocyanatoprop-2-yl)benzene (TMXDI) and adducts of these polyisocyanates with polyols, especially low molecular weight polyols, for example trimethylolpropane, and olyisocyanates which are derived from these polyisocyanates and contain isocyanurate groups and/or biuret groups. Polyisocyanates which it is particularly preferred to employ are hexamethylene diisocyanate and isophorone diisocyanate, polyisocyanates derived from these diisocyanates and containing isocyanurate or biuret groups, which preferably contain more than two isocyanate groups per molecule, and reaction products of hexamethylene diisocyanate and isophorone diisocyanate or of a mixture of hexamethylene diisocyanate and isophorone diisocyanate with 0.3–0.5 equivalents of a low molecular weight polyol having a molecular weight of from 62 to 500, preferably from 104 to 204, in particular of a triol, for example trimethylolpropane.

Dialkyl malonates, or a mixture of dialkyl malonates, are employed as blocking agent (I). Examples of dialkyl malonates which can be employed are dialkyl malonates having 1 to 6 carbon atoms in each of the alkyl radicals, such as dimethyl malonate and diethyl malonate, with diethyl malonate being preferably employed.

Blocking agents which are different from (I) and contain active methylene groups, and oximes, and also mixtures of these blocking agents are employed as bolcking agent (II).

Examples of blocking agents which can be employed as blocking agent (II) are: methyl, ethyl, propyl, butyl, pentyl, hexyl, heptyl, octyl, nonyl, decyl or dodecyl acetoacetate, acetone oxime, methyl ethyl ketoxime, acetylacetone, formaldoxime, acetaldoxime, benzophenoxime, acetoxime and diisobutyl ketoxime. As blocking agent (II) it is preferred to employ an alkyl acetoacetate having 1 to 6 carbon atoms in the alkyl radical, or a mixture of such alkyl acetoacetates, or a ketoxime or a mixture of ketoximes. Particular preference is given to the employment of ethyl acetoacetate or methyl ethyl ketoxime as blocking agent (II).

As component (D) the paints according to the invention contain a pigment or a mixture of pigments. As component (D) it is possible in principle to use all organic or inorganic pigments which are suitable for the preparation of nonaqueous paints, or mixtures of such pigments. The paints according to the invention preferably contain non-transparent pigments or mixtures of non-transparent pigments. Examples of pigments which can be employed are: azo pigments (e.g. Pigment Red 57:1, Pigment Yellow 1, Pigment Yellow 13 and Pigment Red 7) phthalocyanine pigments (e.g. Pigment Blue 15:3 and Phthalocyanine Green), carbonyl pigments (e.g. Pigment Red 88, Pigment Red 177, Pigment Yellow 123, Pigment Violet 19, Pigment Yellow 24 and Pigment Orange 51 and 52), dioxazine pigments (e.g. Pigment Violet 23), titanium dioxide, color black, iron oxide black (magnetite, triiron tetroxide), iron oxide red (hematite, a-diiron trioxide), iron oxide yellow (iron oxide hydroxide), iron oxide brown (mixed pigment of iron oxide red, iron oxide yellow and iron oxide black), chromium oxide green (dichromium trioxide), nickel-titanium yellow, chromium-titanium yellow and cobalt blue. Furthermore, it is also possible to employ special-effect pigments such as, for example, metal flake pigments, in particular aluminum flake pigments and pearlescent pigments.

Components (A), (B) (C) and (D) are employed in the nonaqueous paints according to the invention, in general, in quantities such that component (A) is present in a quantity of from 50 to 90, preferably from 60 to 75, % by weight, component (B) in a quantity of from 5 to 45, preferably from 10 to 25, % by weight and component (C) in a quantity of from 5 to 45, preferably from 10 to 25, % by weight and component (D) in a quantity of from 1 to 25, preferably from 5 to 15, % by weight, the percentages by weight being based on (A)+(B)+(C)+(D)=100% by weight.

As organic solvents, the nonaqueous paints according to the invention contain conventional organic solvents as commonly used for the production of nonaqueous paints. Furthermore, they may also contain other common additives, for example light stabilizers, leveling assistants, etc.

The nonaqueous paints according to the invention can be used for coating any desired substrates, preferably metallic substrates. They are preferably used for the production of topcoats, in particular for the production of single-coat topcoat finishes on motor vehicle bodies. They can be used both for the production of original finishes and for the production of refinishes.

The nonaqueous paints according to the invention are conventionally baked for from 10 to 50, preferably from 15 to 40, particularly preferably from 20 to 30, minutes at temperatures of from 100° to 200° C., preferably from 120° to 180° C. and particularly preferably from 120° to 160° C.

The invention is illustrated in more detail in the examples below. All quantities and percentages are to be understood as by weight, unless expressly stated otherwise.

Preparation of Component (A)

Example 1

Preparation of a hydroxyl group-containing polyacrylate resin 1140 g of polymerization solvent from a fraction of aromatic hydrocarbons having a boiling range of from 158° C. to 172° C. at atmospheric pressure are weighed into a reactor having a useful volume of 4 l and fitted with an adjustable heating device, a paddle stirrer, a thermometer, an inlet pipe for a stream of protective nitrogen gas, one metering vessel each for a monomer mixture and an initiator solution, and a reflux condenser. The solvent is heated to 150° C. Then a mixture of 562 g of tert-butyl acrylate, 182 g of n-butyl methacrylate, 364 g of 2-hydroxypropyl methacrylate, 73 g of 4-hydroxybutyl acrylate and 33 g of acrylic acid is metered in from the metering vessel for the monomer mixture and, simultaneously, a solution of 73 g of tert-butyl perbenzoate in 73 g of the aromatic solvent described above is metered in from the metering vessel for the initiator solution. The monomer mixture is metered uniformly into the reactor over a period of 4 hours, the initiator solution over a period of 4.5 hours. The temperature of the reaction mixture is held at 150° C. during these additions. When the addition of iniator [sic] is complete, the reaction material is held at 150° C. for a further hour, and then the degree of conversion is determined by multiple determination of the nonvolatile fraction of the reaction mixture. As soon as conversion is complete, 526 g of the polymerization solvent are distilled off at 110° C. under vacuum at from 150 to 190 hPa. The batch is then diluted with 101 g of 1-methoxypropyl 2-acetate and is adjusted, using the aromatic solvent mentioned, to a nonvolatile content of approximately 60% by weight. The resulting polymer solution has a nonvolatile content (60 min.; 130° C.) of 59.5%. The polymer has an acid number of 23.6 and an OH number of 139 and a solution viscosity of 390 mPa·s, measured using the described solution in an ICI plate/cone viscometer at 23° C.

Example 2

Preparation of a hydroxyl group-containing alkyd resin 1142 g of hexahydrophthalic anhydride, 1024 g of 1,1,1-trimethylolpropane, 527 g of isononanoic acid as an isomer mixture of 3,3,5-trimethylhexanoic acid and 3,5,5 trimethylhexanoic acid, and 100 g of xylene as entraining agent are weighed into the apparatus described in Example 1, but with the metering vessels and reflux condenser replaced by a water separator and reflux condenser. The water separator is filled with xylene. The contents of the apparatus are heated to 210° C. over the course of 8 hours such that uniform reflux of the entraining agent is brought about. The reaction mixture is held at 210° C. until an acid number of 18.6 and a viscosity of 940 mpa·s are reached, measured on a sample of a 60% strength solution of the reaction mixture in the aromatic solvent described in Example 1. The batch is then cooled to 160° C. and the contents of the apparatus are dissolved with stirring using 1000 g of the aromatic solvent mentioned, and then drained off from the apparatus. The solution is then diluted with the aromatic solvent in a quantity such that the resulting nonvolatile content is 60.5% (60 min.; 130° C.). The alkyd resin prepared in this way has an acid number of 17.1, an OH number of 123, based on the nonvolatile content, and a viscosity of 1200 mPa·s in the solution described, measured in an ICI plate/cone viscometer at 23° C.

Preparation of Component (C)

Example 3
Blocked polyisocyanate 1

504.0 g of a commercial isocyanurate trimer of hexamethylene diisocyanate, and 257.2 g of the aromatic solvent described in Example 1, are weighed into the apparatus described in Example 1, fitted with a metering vessel and a reflux condenser. The solution is heated to 50° C. Then a mixture of 348.0 g of diethyl malonate, 104.0 g of ethyl acetoacetate and 2.5 g of a 50% strength solution of sodium p-dodecylphenolate in xylene is metered into the solution from the metering vessel over a period of 2 hours at a rate such that the temperature does not exceed 70° C.

The mixture is then heated slowly to 90° C. and held at this temperature for 6 hours. Then a further 2.5 g of sodium p-dodecylphenolate solution are added and the mixture is held at 90° C. until the content of NCO groups in the reaction mixture has reached 0.48%. Then 35.1 g of n-butanol are added. The resulting solution has a nonvolatile content of 59.6% (60 min.; 130° C.) and a viscosity of 590 mPa·s, measured in an ICI plate/cone viscometer at 23° C.

Example 4
Blocked polyisocyanate 2

The procedure is as in Example 3. 722.0 g of a commercial isocyanurate trimer of hexamethylene diisocyanate, and 460.0 g of the aromatic solvent described in Example 1, are weighed into the apparatus. A mixture of 527.0 g of diethyl malonate, 130.4 g of ethyl acetoacetate and 4.5 g of a 50% strength solution of sodium p-dodecylphenolate in xylene is weighed into the metering vessel and is metered in and reacted as described. A temperature of 90° C. is maintained until the content of NCO groups in the reaction mixture has reached 0.92%. Then 20.3 g of 1,4-dimethylolcyclohexane are added and the mixture continues to be held at 90° C. until the content of NCO groups in the reaction mixture has reached 0.28%. Then the batch is cooled and 140 g of n-butanol are added. The resulting solution has a nonvolatile content of 56.8% (60 min.; 130° C.) and a viscosity of 405 mpa·s, measured in an ICI plate/cone viscometer at 23° C.

Preparation of Pigment Pastes

Example 5
Pigment paste 1

83.7 parts of the polyacrylate resin solution prepared according to Example 1 are intensively premixed in a dissolver with 5 parts of a commercial carbon black pigment, 1 part of calcium octanoate, 0.3 parts of triethylenetetramine and 10 parts of Solvesso® 150. The resulting mixture is then ground to a pigment unit [sic] of <10 µm in a ball mill.

Example 6
Pigment paste 2

The procedure is as described in Example 5. However, instead of the polyacrylate resin solution the alkyd resin solution prepared in accordance with Example 2 is employed.

Production of pigmented topcoats according to the invention

Example 7
Topcoat 1

29.2 parts of the polyacrylate resin solution prepared in accordance with Example 1, 26.9 parts of the solution of the blocked polyisocyanate 1 prepared in accordance with Example 3 and 6.6 parts of a 90% strength butanolic solution of a commercial melamine resin which contains imino groups and is etherified with methanol (Cymel® 327, Cyanamid) are thoroughly mixed with a laboratory turbine stirrer. The mixture obtained is admixed with 2.3 parts of n-butanol, 4.5 parts of butyldiglycol acetate and 1.5 parts of a commercial 5% strength solution of a leveling assistant based on a polysiloxane, and the additives are stirred in thoroughly. Subsequently, 28 parts of the pigment paste 1 prepared in accordance with Example 5 are added, and are stirred in thoroughly using a laboratory turbine stirrer. The resulting topcoat is diluted with xylene until it has a viscosity of 23 sec. measured in a DIN 4 cup at 20° C.

Example 8
Topcoat 2

The procedure is as described in Example 7. However, instead of the polyacrylate resin solution the alkyd resin solution prepared in accordance with Example 2 is employed, instead of the solution of the blocked polyisocyanate 1 prepared in accordance with Example 3 the solution of the blocked polyisocyanate 2 prepared in accordance with Example 4 is employed, and instead of the pigment paste 1 prepared in accordance with Example 5 the pigment paste 2 prepared in accordance with Example 6 is employed.

Application of the topcoats according to the invention and testing of the resulting coatings The topcoats 1 and 2 prepared in accordance with Example 7 and Example 8 are sprayed onto steel panels coated with a commercial electrodeposition coating and a commercial filler so as to obtain paint films having a dry film thickness of from 40 to 45 µm. The wet films applied are baked, after a pre-drying time of 5 minutes at room temperature, at 140° C. for 20 minutes in a circulating-air oven. The coatings obtained are distinguished by high degree of hardness, high gloss, good adhesion, good topcoat holdout, good scratch resistance, good acid resistance and good weathering resistance.

We claim:
1. Nonaqueous pigmented paints comprising
 (A) a hydroxyl group-containing synthetic resin or a mixture of hydroxyl group-containing synthetic resins present in an amount of from 50 to 90% by weight,
 (B) an amino resin or a mixture of amino resins present in an amount of from 5 to 45% by weight,
 (C) a blocked polyisocyanate or a mixture of blocked polyisocyanates present in an amount of from 5 to 45% by weight, and
 (D) a pigment or a mixture of pigments present in an amount of from 1 to 25% by weight, the percentages by weight being based on (A)+(B)+(C)+(D)=100% by weight, characterized in that component (C) contains both isocyanate groups blocked with a blocking agent (I) and isocyanate groups blocked with a blocking agent (II), in which context the blocking agent (I) is dialkyl malonate or a mixture of dialkyl malonates, the blocking agent (II) is a blocking agent which is different from (I) and contains active methylene groups, or is an oxime, or is a mixture of these blocking agents, and the ratio of equivalents between the isocyanate groups blocked with (I) and the isocyanate groups blocked with (II) is between 1.0:1.0 and 9.0:1.0.

2. Paints according to claim 1, characterized in that component (A) has a hydroxyl number of from 40 to 240.

3. Paints according to claim 1, characterized in that the blocked isocyanate groups present in component (C) are attached to aliphatic or cycloaliphatic radicals.

4. Paints according to claim 1, characterized in that component (C) comprises blocked hexamethylene diisocyanate, blocked isophorone diisocyanate or a mixture of blocked hexamethylene diisocyanate and blocked isophorone diisocyanate.

5. Paints according to claim 1, characterized in that the blocking agent (I) is diethyl malonate.

6. Paints according to claim 1, characterized in that blocking agent II contains active methylene groups and is selected from the group consisting of alkyl acetoacetates having 1 to 6 carbon atoms in the alkyl radical and mixtures thereof.

7. Paints according to claim 1, characterized in that the blocking agent (II) is methyl ethyl ketoxime.

8. Paints according to claim 1, characterized in that the ratio of equivalents between the isocyanate groups blocked with (I) and the isocyanate groups blocked with (II) is between 8.0:2.0 and 6.0:4.0.

9. Paints according to claim 1, wherein the blocking agent (II) is ethyl acetoacetate.

\* \* \* \* \*